United States Patent
Woodside et al.

[11] Patent Number: 5,916,679
[45] Date of Patent: Jun. 29, 1999

[54] IN-LINE PROCESSING OF CONTINUOUS GLASS FIBERS WITH THERMOSET SOLUTION EPOXY

[75] Inventors: Andrew B. Woodside, Pickerington; Joan T. Muellerleile, Bexley; David R. Hartman, Granville, all of Ohio

[73] Assignee: Owens Corning Fiberglas Technology, Inc., Summit, Ill.

[21] Appl. No.: 09/128,317

[22] Filed: Aug. 3, 1998

Related U.S. Application Data

[62] Division of application No. 08/643,050, May 2, 1996, Pat. No. 5,840,370.

[51] Int. Cl.$^6$ .................................................. B32B 9/00
[52] U.S. Cl. ....................... 428/375; 65/60.3; 65/443; 65/447; 65/448; 65/453; 427/386; 427/389.8; 428/378
[58] Field of Search ........................ 65/60.3, 443, 447, 65/448, 453; 427/386, 389.8; 428/375, 378

[56] References Cited

U.S. PATENT DOCUMENTS

| | | |
|---|---|---|
| 2,880,552 | 4/1959 | Whitehurst . |
| 3,143,405 | 8/1964 | Wong . |
| 3,249,412 | 5/1966 | Kolek et al. . |
| 3,349,222 | 10/1967 | Johnston . |
| 3,384,505 | 5/1968 | Palmer et al. . |
| 3,576,705 | 4/1971 | Goldsworthy . |
| 3,620,701 | 11/1971 | Janetos et al. . |
| 3,653,860 | 4/1972 | Smith et al. . |
| 3,717,448 | 2/1973 | Smith . |
| 3,718,448 | 2/1973 | Drummond et al. . |
| 3,718,449 | 2/1973 | Fahey . |
| 3,852,051 | 12/1974 | Fahey . |
| 3,853,605 | 12/1974 | Fahey . |
| 3,867,328 | 2/1975 | Fahey . |
| 3,887,347 | 6/1975 | Reese et al. . |
| 3,918,947 | 11/1975 | Maaghul et al. . |
| 3,925,286 | 12/1975 | Fahey . |
| 3,940,357 | 2/1976 | Morrison et al. . |
| 3,996,033 | 12/1976 | Chickowski . |
| 3,997,306 | 12/1976 | Hedden . |
| 4,013,435 | 3/1977 | Kane et al. . |
| 4,042,360 | 8/1977 | Kane et al. . |
| 4,049,597 | 9/1977 | Motsinger . |
| 4,076,869 | 2/1978 | Flynn . |
| 4,197,228 | 4/1980 | Lin et al. . |
| 4,220,686 | 9/1980 | Brook . |
| 4,351,725 | 9/1982 | Das et al. . |
| 4,427,482 | 1/1984 | Yamada et al. . |
| 4,440,557 | 4/1984 | Morrison et al. . |
| 4,501,787 | 2/1985 | Marchetti et al. . |
| 4,528,308 | 7/1985 | Waddill . |
| 4,593,069 | 6/1986 | Kamagata et al. . |
| 4,615,946 | 10/1986 | Temple . |

(List continued on next page.)

FOREIGN PATENT DOCUMENTS

| | | |
|---|---|---|
| 441453A2 | 2/1991 | European Pat. Off. . |
| 805127A1 | 4/1997 | European Pat. Off. . |

OTHER PUBLICATIONS

Derwent Publications Ltd., London, GB; Class A32, AN 97–037421 XP002075584, no date.
Derwent Publications Ltd., London, GB; Class A32, AN 96–460205 XP002075585, no date.
Clayton A. May, *Epoxy Resins Chemistry and Technology* pp. 687–690, no date.

*Primary Examiner*—Michael Lusignan
*Attorney, Agent, or Firm*—Inger H. Eckert

[57] ABSTRACT

A method is disclosed for forming pre-impregnated fibers suitable for making a composite article. A plurality of fibers (14) are pre-impregnated with about 50% by weight of an aqueous-based chemical treatment containing a curable resin, and then contacted with a drying device (41) which effects drying of the chemical treatment without effecting full curing of the resin. The pre-impregnated fibers may then be formed into a composite article in a subsequent forming operation, for example, by filament winding, pultrusion, weaving, knitting, or extrusion coating.

19 Claims, 1 Drawing Sheet

U.S. PATENT DOCUMENTS

| | | |
|---|---|---|
| 4,745,028 | 5/1988 | Das et al. . |
| 4,853,021 | 8/1989 | Soszka et al. . |
| 5,011,523 | 4/1991 | Roncato et al. . |
| 5,055,119 | 10/1991 | Flautt et al. . |
| 5,120,384 | 6/1992 | Yoshimitsu et al. . |
| 5,123,949 | 6/1992 | Thiessen . |
| 5,178,657 | 1/1993 | Gicquel . |
| 5,310,600 | 5/1994 | Tsuya et al. . |
| 5,312,651 | 5/1994 | Takada et al. . |
| 5,316,561 | 5/1994 | Toncato et al. . |
| 5,387,468 | 2/1995 | Pollet et al. . |
| 5,605,757 | 2/1997 | Klett ................................. 427/386 X |
| 5,700,574 | 12/1997 | Flautt et al. . |
| 5,779,758 | 7/1998 | Mann et al. . |
| 5,840,370 | 11/1998 | Woodside et al. . |

IN-LINE PROCESSING OF CONTINUOUS GLASS FIBERS WITH THERMOSET SOLUTION EPOXY

CROSS REFERENCE TO RELATED APPLICATION(S)

This is a division of U.S. patent application Ser. No. 08/643,050, filed May, 1996, now U.S. Pat. No. 5,840,370, patented Nov. 24, 1998.

TECHNICAL FIELD

The present invention relates to a method for forming pre-impregnated fibers, and more particularly, to a method in which a chemical treatment containing a curable resin is applied to the fibers which does not fully cure in-line, but rather completely cures during off-line processing of the fibers into a composite article.

BACKGROUND OF ART

Glass and other ceramic fibers are commonly manufactured by supplying molten ceramic to a bushing, drawing fibers from the bushing, applying a chemical treatment, such as an aqueous-based system, so as to size the drawn fibers, and then gathering the sized fibers into a tow or strand.

In order to fabricate composite parts, the fibers are often further chemically treated in an off-line impregnation process with a polymeric resin. The resin has been a thermoset, either one or two part, or a thermoplastic. For example, a bundle of continuous glass fibers may be impregnated with a thermosetting resin and then pulled through a heated pultrusion die to cure the resin and make composite parts such as ladder rails. Fibers have been treated in other off-line processes such as filament winding by feeding the fibers through a bath of curable resin and then winding and curing the fibers to form filament wound parts.

However, in such off-line processes, the continuous glass fibers must be separated in some manner to allow impregnation of the resin between the fibers and then recombined. This almost always involves the use of additional hardware such as spreader bars, impregnation baths, and drying or curing ovens. These types of processes have the disadvantage that they add cost and complexity to the process. In addition, the resultant extra handling of the glass fibers can cause breakage of the individual glass filaments and, thereby, a degradation of the properties of the composite article. Therefore, while such off-line processes may be effective, they are time consuming and inefficient (i.e., always requiring additional process steps) and, thus, expensive. Accordingly, there is a need in the art for an efficient and cost effective in-line process for applying a chemical treatment to glass and other fibers so as to form a pre-impregnated ("prepreg") glass/polymer composite bundle or strand, where the resulting prepreg strand is suitable for subsequent processing into a composite article with little or no additional resin treatment.

DISCLOSURE OF INVENTION

The present invention meets this need by providing a method for pre-impregnating fibers by applying an aqueous-based chemical treatment or composition to the fibers. The chemical treatment contains a water soluble or water dispersible thermoset resin system which does not fully cure in-line, but which can be completely cured during a subsequent forming operation. The thermoset resin system includes a curable resin and may or may not include a curing agent or catalyst. The chemical treatment may be applied with sufficient amounts of the thermosetting resin to form all of the matrix of the final composite article. Alternatively, additional resin material, which may be the same or different than the type of resin material used in the chemical treatment, may be added with the pre-impregnated fibers during the final composite product forming process to form the balance of the matrix.

In accordance with one aspect of the present invention, a method of forming pre-impregnated fibers suitable for making a composite article is provided comprising the steps of providing a plurality of fibers and then applying an aqueous-based chemical treatment containing a curable resin to the fibers. The chemically treated fibers are then brought into contact with a drying device to effect drying of the applied chemical treatment without effecting full curing of the resin. It may be desirable for the chosen resin to exhibit little or no curing when the fibers are brought into contact with the drying device.

The resin applied to the fibers can be a heat curable type. In addition, the curable resin can comprise an epoxy resin and, if used, the curing agent can comprise an amine. It is desirable for the fibers to be pre-impregnated with about 50% by weight of the aqueous-based chemical treatment to ensure sufficient loading of solids on the fibers. Pre-impregnating involves applying a sufficient amount of the chemical treatment to a plurality of fibers such that the spaces between the fibers are substantially filled when the fibers are formed into a bundle or strand. Sizing, on the other hand, involves applying at least a thin coating of chemical treatment to the surface of each glass fiber.

In one embodiment of the invention, the fibers are glass fibers and the step of providing a plurality of fibers includes drawing the glass fibers from a source of molten glass. The fibers of the present invention can also include preformed glass and/or synthetic fibers.

The drying device used in the present invention can comprise a contact plate which transfers energy in the form of heat to the chemical treatment on the fibers such that the chemical treatment on the fibers is dried but the resin is not fully cured. The drying device drives off the water from the aqueous-based chemical treatment and, depending on the thermoset resin system used, may effect little or no curing, or partial curing of the resin. The resin on the fibers is then fully cured in a subsequent forming operation, such as a filament winding process (e.g., the filament winding of pipe) or a pultrusion process (e.g., to form ladder rails). The pre-impregnated fibers may also be used in a variety of other off-line processes. For example, the fibers may be extrusion coated and chopped into long fiber strands for use in thermoplastic reinforcement applications such as polybutylene terephthalate reinforcements, or they may be woven or knitted into a composite fabric for use in forming composite articles having reinforcing fibers disposed in a matrix of a polymeric material.

Thus, the present invention also provides a method of making a composite article in which fibers, pre-impregnated with an aqueous-based chemical treatment containing a curable resin, are dried without effecting complete curing of the resin and formed into a composite article in a subsequent forming operation.

Accordingly, it is a feature of the present invention to provide a method for forming pre-impregnated fibers in which an aqueous-based chemical treatment containing a curable resin is applied to the fibers and dried without effecting full curing of the resin. It is a further object of the invention to provide a method for making a composite article in a subsequent forming operation utilizing such pre-impregnated fibers. These, and other features and advantages of the present invention will become apparent from the following detailed description, the accompanying drawing, and the appended claims.

MODES FOR CARRYING OUT THE INVENTION

Figure 1:
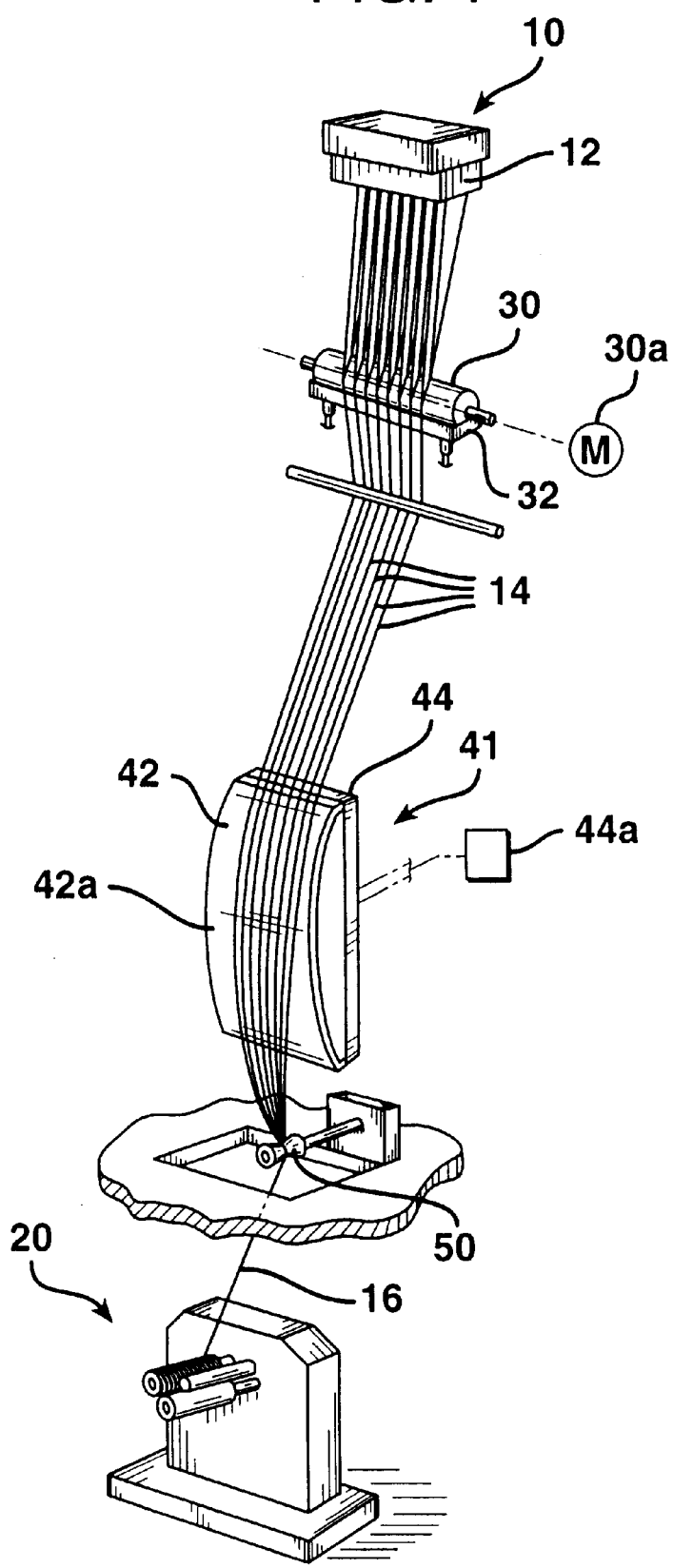
FIG. 1 is a perspective view of an apparatus for pre-impregnating fibers in accordance with the present invention.

The method of the present invention allows an aqueous-based chemical treatment to be applied to fibers during an in-line process and dried without effecting full curing of the resin in the chemical treatment. This provides several advantages over prior art methods which apply an aqueous size to the fibers during the glass forming process and then draw the fibers through an off-line resin bath prior to final processing steps. With the present invention, the applied chemical treatment may form all of the matrix of the final composite article. Hence, off-line processes such as filament winding or pultrusion processes may be practiced without requiring the addition of further resin material and, as a result, such processes can be run at much faster speeds. Alternatively, additional resin material, which may be the same as or different than the type of resin material used in the chemical treatment, may be added with the preimpregnated fibers during the final composite product forming process to form the balance of the matrix. Any additional resin can be added very quickly since the glass fibers of a formed strand are already sufficiently wet throughout, i.e., the resin has already penetrated the fibers such that only the outer, exposed surface of the strand needs to be coated.

While the fibers referred to in the drawings are continuously formed glass fibers, other types of fibers are also suitable for use in the present invention including preformed fibers (fibers which were previously formed off-line), synthetic fibers (non-glass fibers) such as Kevlar®, carbon or graphite fibers, silicon carbide (SiC) fibers, polymeric fibers (preformed or continuously formed), and other non-glass fibers.

A desirable chemical treatment or composition for use in the present invention comprises an epoxy resin and an amine curing agent. Exemplary epoxy resins include Shell EPI-REZ 35XX-W-60 and 6006-W-70, EPI-CURE 8535-Y-50, EPON 862 epoxy bisphenol F liquid, which are commercially available from Shell Oil Company. An exemplary curing agent is dicyanodiamide. This curing agent is desirable because it requires exposure to a high temperature environment for a sufficient amount of time, such as 15 minutes, before curing is initiated, thus preventing any partial curing of the epoxy resin during passage over the heating device 41 or prior to the subsequent curing operation.

In addition to a curing agent, the present chemical treatment may include an accelerant such as, for example, EMI-24 imidazole (2-ethyl, 4-methyl imidazole), commercially available from Air Products. Another exemplary accelerant is 2-methyl imidazole available from Aldrich Chemical Co. The accelerant increases the rate at which the resin is cured, thereby enabling the flow (i.e., viscosity) and tack (i.e., degree of curing) of the pre-impregnated fibers to be optimized.

When an accelerant is included, the curing profile of the chemical treatment may also be adjusted by varying the ratio of the accelerant and curing agent used for different processes and applications (e.g., the amount of the accelerant may be decreased while keeping the amount of the curing agent the same) so as to optimize the shelf life of the resulting fiber strand 16. This allows for the control of the onset of the crosslinking reaction and viscous flow for consolidation.

The epoxy resin and curing agent are preferably applied in a stoichiometric ratio such that a loading of at least about 30% solids (i.e., after the water in the chemical treatment has been driven off) is achieved; however, the ratio may vary depending on the desired end use for the pre-impregnated fibers. For example, in embodiments where glass fibers are used and additional matrix resin is to be added off-line, the fibers may be pre-impregnated with a low level of resin. When applied at low levels, the chemical treatment can be selected so as to tailor the interface between the glass surface and the matrix resin, for example, to obtain better wetting of the impregnated glass fibers by the matrix resin. That is, the chemical treatment can be chosen so as to provide better coverage and bonding of the matrix material to the pre-impregnated glass fibers.

Other heat curable resins may also be used in the present invention, including polyurethanes and polyimides. It should be appreciated that when these or other heat curable resins are used, the drying device may effect partial curing of the applied resin.

Optionally, the present chemical treatment may also include a silane coupling agent as well as a small amount of citric acid which functions to disperse silane.

FIG. 1 illustrates an apparatus for preimpregnating glass fibers in accordance with the present invention. This apparatus includes a heated bushing 12 having a number of orifices (not shown) through which a plurality of streams of molten glass are discharged. The streams of glass are mechanically drawn to form continuous fibers 14 via a drawing device illustrated as a rotatable member or winder device 20. The fibers 14 pass over an applicator roller 30 which applies the aqueous-based chemical treatment containing the curable resin to the fibers 14. A trough 32 containing the chemical treatment is positioned below the roller 30. The roller 30 extends into the trough 32 and, as it is rotated by a conventional drive device 30a, transfers an amount of the chemical treatment from the trough 32 to the fibers 14. Other devices or techniques for applying a chemical treatment to the glass fibers 14 may be used in place of the applicator roller 30.

In the illustrated embodiment, the coated fibers 14 pass over and contact a heating device 41 which is substantially similar to the heating device set forth in commonly assigned, copending U.S. application Ser. No. 08/291,801, filed Aug. 17, 1994, and entitled "Method and Apparatus for Forming Continuous Glass Fibers," abandoned in favor of continuation application U.S. Ser. No. 08/651,197, now U.S. Pat. No. 5,779,758 the disclosure of which is hereby incorporated by reference.

The heating device 41 comprises a first plate 42 (also referred to herein as a contact plate) having a curved outer surface 42a which makes direct contact with the coated fibers 14. A resistance-heated second plate 44, which is connected to a power supply 44a, is spaced a small distance from the first plate 42 and serves to radiantly heat the first plate 42. As the fibers 14 pass over the first plate 42, energy in the form of heat is transferred from the first plate 42 to the coated fibers 14. The heat transferred from the first plate 42 to the fibers 14 then evaporates water from the chemical treatment. Depending on the type of resin and/or curing system used, the heating device may effect little or no curing of the resin on the fibers 14, or partial curing may take place.

The temperature of the hot plate 42 is preferably maintained at a temperature of between about 1000° F. and 1500° F., and most preferably at a temperature of between about 1200° F. to 1300° F. As the fibers 14 contact the plate 42, a substantial amount of the heat energy is directed toward evaporation of the water. Accordingly, the heat will not fully cure the resin in the chemical treatment because the fibers 14 are not in contact with the plate 42 long enough to reach a temperature where the resin will fully cure.

After passing over the first plate 42, the fibers 14 are gathered via a gathering shoe 50 to form a single tow or strand 16. From the gathering shoe 50, the tow 16 is wound via the winder device 20 to form a glass fiber package 52. When the pre-impregnated fibers 14 are to be subsequently filament-wound, it is desirable for the fibers 14 to be unwound from the package, then filament wound into the desired composite article and cured. The pre-impregnated fibers are preferably cured at a temperature of from 150° F. to 350° F., depending on the type of curing system used.

In a pultrusion process, the pre-impregnated fibers are unwound from the package 52, pulled through a heated die and cured.

The pre-impregnated fibers formed by the method of the present invention may also be formed into a composite fabric, for example by knitting, using the apparatus set out in U.S. application Ser. No. 08/527,601 filed Sep. 13, 1995, and entitled "Method and Apparatus for Forming a Composite Fabric", the disclosure of which is hereby incorporated by reference. In such a process, the fibers are preferably cured after the fabric is formed during a post-heating process.

The pre-impregnated fibers may also be extrusion coated, cured and used in thermoplastic reinforcement applications such as polybutylene terephthalate reinforcements.

In order that the invention may be more readily understood, reference is made to the following examples, which are intended to be illustrative of the invention, but are not intended to limit the scope of the present invention.

EXAMPLE 1

A chemical treatment was prepared in accordance with the present invention which included 5000 g. of EPI-REZ 3522-W-60 (available from Shell Oil Co.), 60 g. of dicyandiamide, 15 g. of 2-methyl imidazole, 60 g. of a silane coupling agent (commercially available from OSi Specialties Inc. under the product name A-187), 214 g. of butoxy ethyl stearate, and 1000 g. of deionized water. The chemical treatment was initially applied to a plurality of glass fibers with an applicator roller at a rate of 130 g./min. The coated fibers were then dried by a drying device. The dried fibers had a solids content of about 22% by weight. Curing of the coated resin was effected when the coated fibers were subsequently formed into NOL rings by being placed in molds which were heated at about 300–350° F. for approximately one half hour. No additional resin was applied to the fibers prior to the forming operation.

EXAMPLE 2

The chemical treatment prepared in Example 1 was applied to a plurality of fibers which were subsequently dried by a drying device. The resulting coated fibers had a solids content of about 25% by weight. The coated fibers were then formed into a unidirectional laminate and cured for 4 hours at a temperature of about 350° F. No additional resin was applied to the coated fibers prior to laminate formation.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of forming preimpregnated fibers suitable for making a composite article comprising the steps of:
   (a) providing a plurality of fibers (14);
   (b) applying a chemical treatment to said fibers to form coated fibers (14), said chemical treatment containing a curable resin; and
   (c) drying said chemical treatment on said coated fibers (14) with a drying device (41) to effect drying of said chemical treatment without effecting full curing of said resin, said dried fibers having a solids content of at least about 30% by weight.

2. The method of claim 1 in which said resin is heat curable.

3. The method of claim 1 in which said chemical treatment includes a curing agent for said resin.

4. The method of claim 3 in which said resin comprises an epoxy resin.

5. The method of claim 3 in which said curing agent comprises an amine.

6. The method of claim 1 in which said fibers are pre-impregnated with an aqueous-based chemical treatment.

7. The method of claim 1 in which said fibers are glass fibers and the step of providing a plurality of fibers includes drawing the glass fibers from a source of molten glass.

8. The method of claim 1 further including the step of fully curing said resin on said fibers in a subsequent forming operation.

9. The method of claim 8 in which said subsequent forming operation comprises a filament winding process.

10. The method of claim 1 in which said chemical treatment includes a ring agent for said resin.

11. The method of claim 3 in which said resin comprises an epoxy resin.

12. The method of claim 3 in which said curing agent comprises an amine.

13. The method of claim 7, wherein said chemical treatment is applied to said fibers directly after said fibers are drawn from said source of molten glass and before said fibers are gathered together in a tow.

14. A method of making a composite article comprising the steps of
   providing a plurality of drawn fibers (14);
   applying an aqueous-based chemical treatment to said fibers to form coated fibers (14), said chemical treatment containing a curable resin;
   heating said coated fibers (14) with a drying device (41) to effect drying of said chemical treatment without effecting full curing of said resin, said dried fibers having a solids content of at least about 30% by weight; and
   forming said coated fibers into a composite article in a forming operation.

15. A plurality of pre-impregnated fibers (14) suitable for making a composite article, wherein said fibers have been pre-impregnated with an aqueous-based chemical treatment containing a curable resin and dried to form dried fibers coated with said resin in a partially cured state, said dried fibers having, a solids content of at least about 25% by weight.

16. The pre-impregnated fibers of claim 15 which said resin is heat curable.

17. The pre-impregnated fibers of claim 15 in which said chemical treatment includes a curing agent for said resin.

18. The pre-impregnated fibers of claim 15 in which said dried fibers have a solids content of at least about 30% by weight.

19. A method of forming preimpregnated fibers suitable for making a composite article comprising the steps of:
(a) providing a plurality of fibers (14);
(b) applying an aqueous-based chemical treatment to said fibers to form coated fibers (14), said chemical treatment containing a curable resin; and
(c) heating said coated fibers with a drying device (41) to effect drying of said chemical treatment without effecting full curing of said resin, said dried fibers having a solids content of at least about 30% by weight.

* * * * *